US008456577B2

(12) United States Patent
Pandya

(10) Patent No.: US 8,456,577 B2
(45) Date of Patent: Jun. 4, 2013

(54) METHOD AND APPARATUS FOR CHROMA KEY PRODUCTION

(75) Inventor: Mehul S. Pandya, Nevada City, CA (US)

(73) Assignee: GVBB Holdings S.A.R.L., Luxembourg (LU)

( * ) Notice: Subject to any disclaimer, the term of this patent is extended or adjusted under 35 U.S.C. 154(b) by 569 days.

(21) Appl. No.: 12/451,626

(22) PCT Filed: Sep. 18, 2007

(86) PCT No.: PCT/US2007/020192
§ 371 (c)(1),
(2), (4) Date: Nov. 20, 2009

(87) PCT Pub. No.: WO2009/005511
PCT Pub. Date: Jan. 8, 2009

(65) Prior Publication Data
US 2010/0128980 A1    May 27, 2010

(30) Foreign Application Priority Data

Jun. 29, 2007 (WO) ................ PCT/US2007/015254

(51) Int. Cl.
*H04N 9/75* (2006.01)
*H04N 9/74* (2006.01)
(52) U.S. Cl.
USPC ........... 348/592; 348/587; 348/586; 348/591; 348/590; 348/93; 382/162; 382/167
(58) Field of Classification Search
USPC ................ 348/586, 703, E9.056, 59, E5.085, 348/E5.059, 590–599, 578, 584, 187; 315/292, 315/293, 294, 295; 382/167; 345/113, 114, 345/426, 435
See application file for complete search history.

(56) References Cited

U.S. PATENT DOCUMENTS

| 4,160,994 A | * | 7/1979 | Mendrala | 348/587 |
| 4,386,363 A | * | 5/1983 | Morrison | 348/587 |
| 4,408,221 A | * | 10/1983 | McCoy | 348/587 |
| 5,305,107 A | * | 4/1994 | Gale et al. | 348/590 |
| 5,345,313 A |   | 9/1994 | Blank | |
| 5,455,633 A | * | 10/1995 | Gehrmann | 348/587 |
| 5,500,684 A | * | 3/1996 | Uya | 348/592 |
| 5,502,482 A | * | 3/1996 | Graham | 348/140 |
| 5,563,988 A | * | 10/1996 | Maes et al. | 345/421 |

(Continued)

FOREIGN PATENT DOCUMENTS

| CN | 1217126 A | 5/1999 |
| GB | 2044036 | 10/1980 |

(Continued)

OTHER PUBLICATIONS

Search Report dated Mar. 4, 2008.

(Continued)

*Primary Examiner* — Mekkonen Bekele
(74) *Attorney, Agent, or Firm* — Arent Fox, LLP

(57) ABSTRACT

The method and apparatus for generating an adaptive chroma key includes taking into consideration foreground object information during the creation of a composite scene. The luminance and chrominance of an area of interest between a foreground key and a background scene are considered and accounted for during the created of the composite scene.

19 Claims, 5 Drawing Sheets

U.S. PATENT DOCUMENTS

| | | | | |
|---|---|---|---|---|
| 5,767,911 | A * | 6/1998 | Boon | 375/240.12 |
| 5,907,315 | A | 5/1999 | Vlahos et al. | |
| 6,122,014 | A * | 9/2000 | Panusopone et al. | 348/592 |
| 6,141,063 | A * | 10/2000 | Gehrmann | 348/592 |
| 6,348,953 | B1 * | 2/2002 | Rybczynski | 348/584 |
| 6,400,371 | B1 | 6/2002 | Helman et al. | |
| 6,441,865 | B1 * | 8/2002 | Hailey | 348/586 |
| 6,496,599 | B1 * | 12/2002 | Pettigrew | 382/162 |
| 6,538,396 | B1 | 3/2003 | Vlahos et al. | |
| 7,006,155 | B1 | 2/2006 | Agarwala et al. | |
| 2003/0133044 | A1 | 7/2003 | Akiyama et al. | |
| 2005/0036709 | A1 * | 2/2005 | Imai | 382/286 |
| 2005/0212820 | A1 * | 9/2005 | Liu et al. | 345/620 |
| 2009/0263046 | A1 * | 10/2009 | Imai | 382/286 |

FOREIGN PATENT DOCUMENTS

| | | |
|---|---|---|
| JP | 58161483 | 9/1983 |
| JP | 8111815 | 4/1996 |
| JP | 2000509225 A | 7/2000 |
| JP | 2000224410 | 8/2000 |
| JP | 2004007700 A | 1/2004 |
| WO | WO8405007 | 12/1984 |
| WO | 9741693 A1 | 11/1997 |
| WO | WO 9741697 A1 * | 11/1997 |
| WO | WO0021283 | 4/2000 |

OTHER PUBLICATIONS

First Office Action mailed Jul. 4, 2011 in Chinese Application No. 200780053582.8.

Notice of Reasons for Rejection in Japanese Patent Application No. 2010-514725 dispatched Jul. 24, 2012.

Abstract of WO 9741693 dated Nov. 6, 1997.

Abstract of JP 2004007700 dated Jan. 8, 2004.

Abstract of JP 2000509225 dated Jul. 18, 2000.

* cited by examiner

FIG. 7
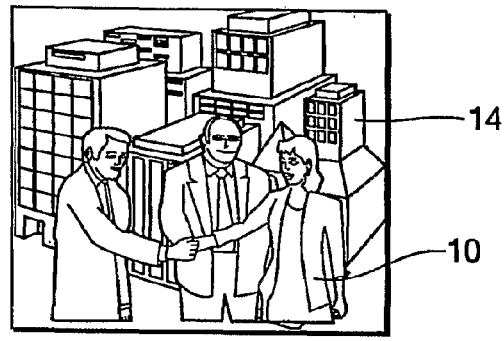
FIG. 8
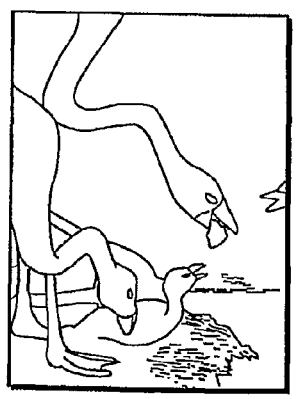 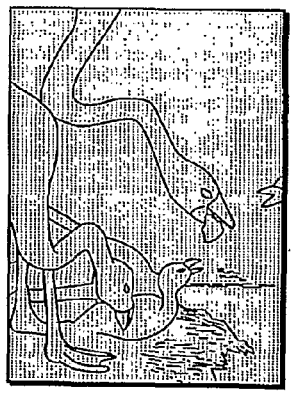 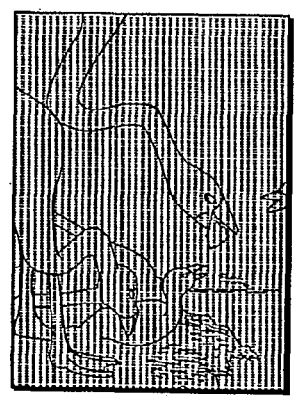
FIG. 9a     FIG. 9b     FIG. 9c

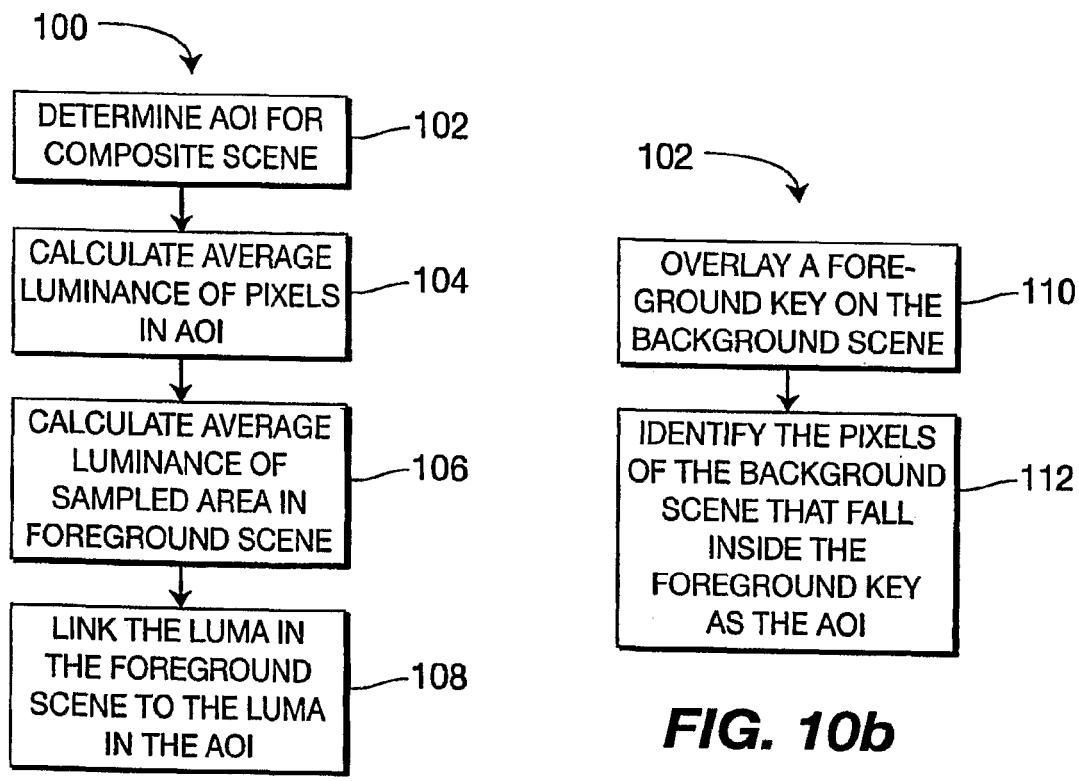
FIG. 10a
FIG. 10b
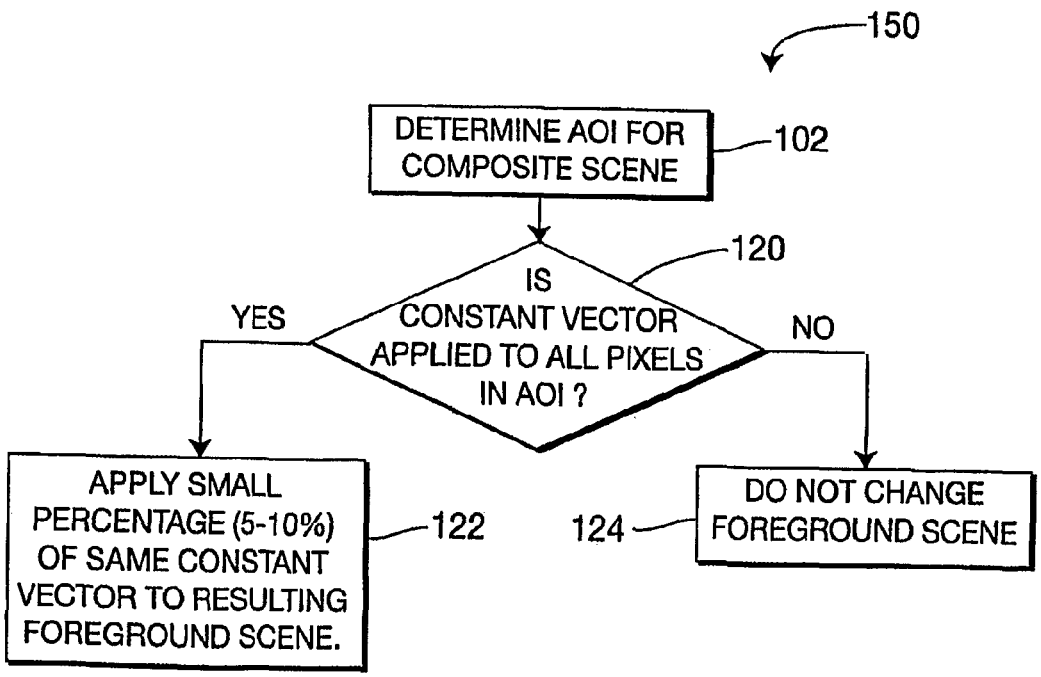
FIG. 11

METHOD AND APPARATUS FOR CHROMA KEY PRODUCTION

This application claims the benefit, under 35 U.S.C. §365 of International Application PCT/US2007/020192, filed Sep. 18, 2007 which was published in accordance with PCT Article 21(2) on Jan. 8, 2009 in English and which claims the benefit of United States PCT patent application No. PCT/US2007/015254 filed Jun. 29, 2007.

The present principles relate to chroma keying. More particularly, it relates to the production of an adaptive chroma key.

A chroma key generally places foreground objects in a background scene. Since chroma key parameters are calculated for every field based on the foreground scene only, the foreground object cannot adapt to the background scene lighting. Thus, the use of ambient or artificial light changes.

In fact, chroma key parameters are based on homogenized studio-lighting conditions rather than the lighting in the background scene. This type of lighting mismatch fails to produce a natural chroma key.

It is an aspect of the present principles to provide an adapative chroma key that overcomes the shortfalls of the prior art.

This and other aspects are achieved by the method for producing a chroma key which includes determining an area of interest (AOI) for a composite scene using a foreground key, and generating a chroma key taking into consideration physical properties of pixels in the determined AOI.

In accordance with another aspect of the present principles the apparatus for producing a chroma key includes a source selection device configured to determine an area of interest (AOI) for a composite scene using a foreground key and generate a chroma key taking into consideration physical properties of pixels in the determined AOI. The source selection device could include a plurality of input sources, a processor, switching logic in communication with the processor, and an adaptive chroma key sub-system connected to the processor and switching logic, said adaptive chroma key sub-system operating under the control of the processor to selectively combine two or more of the input sources for the composite scene.

Other aspects and features of the present principles will become apparent from the following detailed description considered in conjunction with the accompanying drawings. It is to be understood, however, that the drawings are designed solely for purposes of illustration and not as a definition of the limits of the present principles, for which reference should be made to the appended claims. It should be further understood that the drawings are not necessarily drawn to scale and that, unless otherwise indicated, they are merely intended to conceptually illustrate the structures and procedures described herein.

In the drawings wherein like reference numerals denote similar components throughout the views:

FIG. 7 is a graphical representation of the composite scene with both brighter background and foreground objects;

FIG. 8 is a graphical representation of the composite scene with both darker background and foreground objects;

FIGS. 9a-9c are graphical representations showing how different hues in a background scene can create different but matching foreground objects;

FIG. 10a is a flow diagram of the luminance determination for the display of the composite image according to an implementation of the present principles;

FIG. 10b is a block diagram of the determination of the AOI for the chroma key according to an implementation of the present principles;

FIG. 11 is flow diagram of the chrominance determination and application for the display of the composite image according to an implementation of the present principles;

Generally speaking, a chroma key allows the placement of foreground objects in a background scene. Since the chroma key parameters are calculated for every field based on the foreground scene only, the foreground object cannot adapt to the background scene lighting (e.g., ambient and artificial) changes. In fact, the chroma key parameters are often homogenized for studio-lighting conditions rather than the lighting in the background scene.

The present principles provides an alternative to this chroma keying scheme by allowing an adaptive creation of the chroma key using luminance and chrominance information from the background scene.

Figure 1:
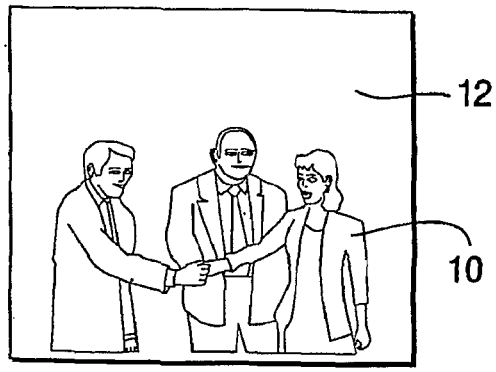
FIG. 1 is a graphical representation of a foreground scene in a green-colored virtual studio set.
Figure 4:
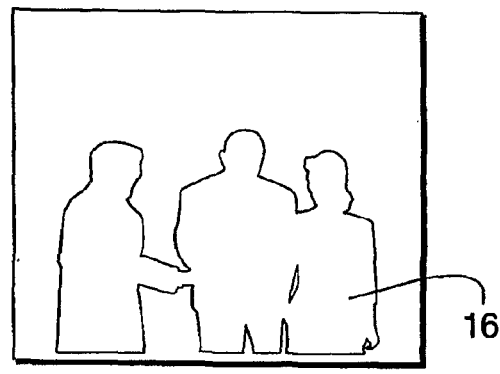
FIG. 4 is a graphical representation of the foreground key.
Figure 2:
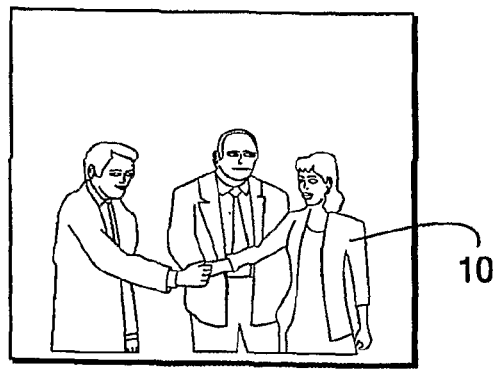
FIG. 2 is a graphical representation of the foreground objects in the scene.
Figure 5:
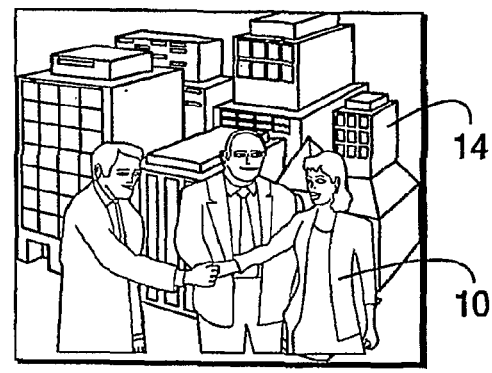
FIG. 5 is graphical representation of the composite output of both the foreground and background scenes.
Figure 3:
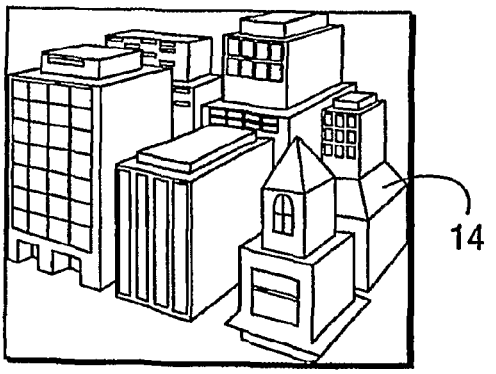
FIG. 3 is a graphical representation of the background scene intended for use with the foregoing scene.

FIGS. 1-5 show some background information for understanding the concepts of the present principles. FIG. 1 shows a foreground scene 10 (represented by the people in the picture) and a green-colored virtual studio set 12. FIG. 2 shows the foreground objects 10 without the virtual studio set 12. FIG. 3 shows a background scene 14 to be displayed on the cirtual studio set. FIG. 4 shows a foreground key 16 representing the images of the foregoing scene to be superimposed over the background scene. FIG. 5 is a representation of the composite output image resulting from combination of the background scene 14 and the foreground scene 10.

Figure 6:
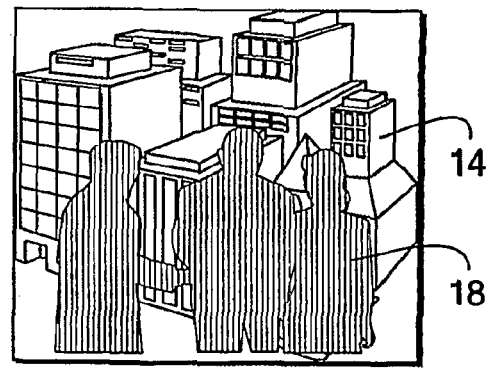
FIG. 6 is a graphical representation of the Area of interest (AOI) in the composite scene.

Initially, and in accordance with the present principles, a determination as to the area of interest (AOI) between the foreground scene and the background scene is made (step 102 FIG. 10a). Referring to FIG. 10b, in order to do this, a foreground key is overlayed onto the background scene (110), and an identification of all the pixels of the background scene that falls inside the foreground key is made (112). This identification constitutes the AOI. FIG. 6 shows a graphical representation of the AOI 18 as obtained from this process.

In accordance with one implementation, the information from the background scene is used by the chroma key logic to adaptively create the chroma key. In doing this, the method includes considering one or more physical properties of the pixels in the determined AOI in order to create the chroma key. In the present example, these physical properties include the luminance and the chrominance of the pixels.

FIG. 10a shows the method 100 for considering the luminance of the AOI, and FIG. 11 shows the method 150 for considering the chrominance of the AOI.

Referring to FIG. 10a; initially the determination (102) as to the AOI for the composite scene is made. The average luminance of pixels in the AOI is then calculated (104), and the average luminance of a sampled area in the foreground scene is also calculated (106). Once these luminance calculations have been made, the Lima in the foreground scene is linked to the luma in the AOI (108). In other words, we are applying the difference (delta) in luma AOI to luma in the foreground scene for every field. If the background has dramatic lighting changes, such as a video clip show through bright and dark streets of Manhattan. The foreground object (e.g., a new reader or report) will adapt to the background scene and change its lighting accordingly. FIG. 7 shows an example of a brighter background having brighter foreground objects, and FIG. 8 shows an example of a darker background having darker foreground objects.

FIG. 11 shows an example of the method 150 where the chrominance signal is considered. After the determination 102 of the AOI; it is determined (120) whether a constant vector is applied to all pixels in the AOI. If not, the foreground scene remains unchanged (124). If there is a constant vector applied to all pixels in the AOI, a small percentage of the same constant vector is applied to the resulting foreground scene. For example, if the background scene is a disco club with rotating multi-colored light beams, the foreground object adapts to hue changes in the background scene (i.e., if a red beam of light falls on the AOI, a slight tinge of red will appear on the foreground object as well. Thus, different hues in the background scene can create different, but matching objects in the foreground. This concept is shown in the exemplary images of FIGS. 9a-9c. In each figure, the hue is different, resulting in a change in the foreground object color and thereby an overall change of the entire composite image displayed. FIG. 9b shows the effect of a reddish hue (represented by an array of very small dots covering the entire FIG. 9b) added to the background lighting and the overall effect of the same on the foreground objects (i.e., the matching of the same with the background), while FIG. 9c shows the effect of a greenish hue (represented by an array of very small dashes covering the entire FIG. 9c) in the background scene.

Figure 12:
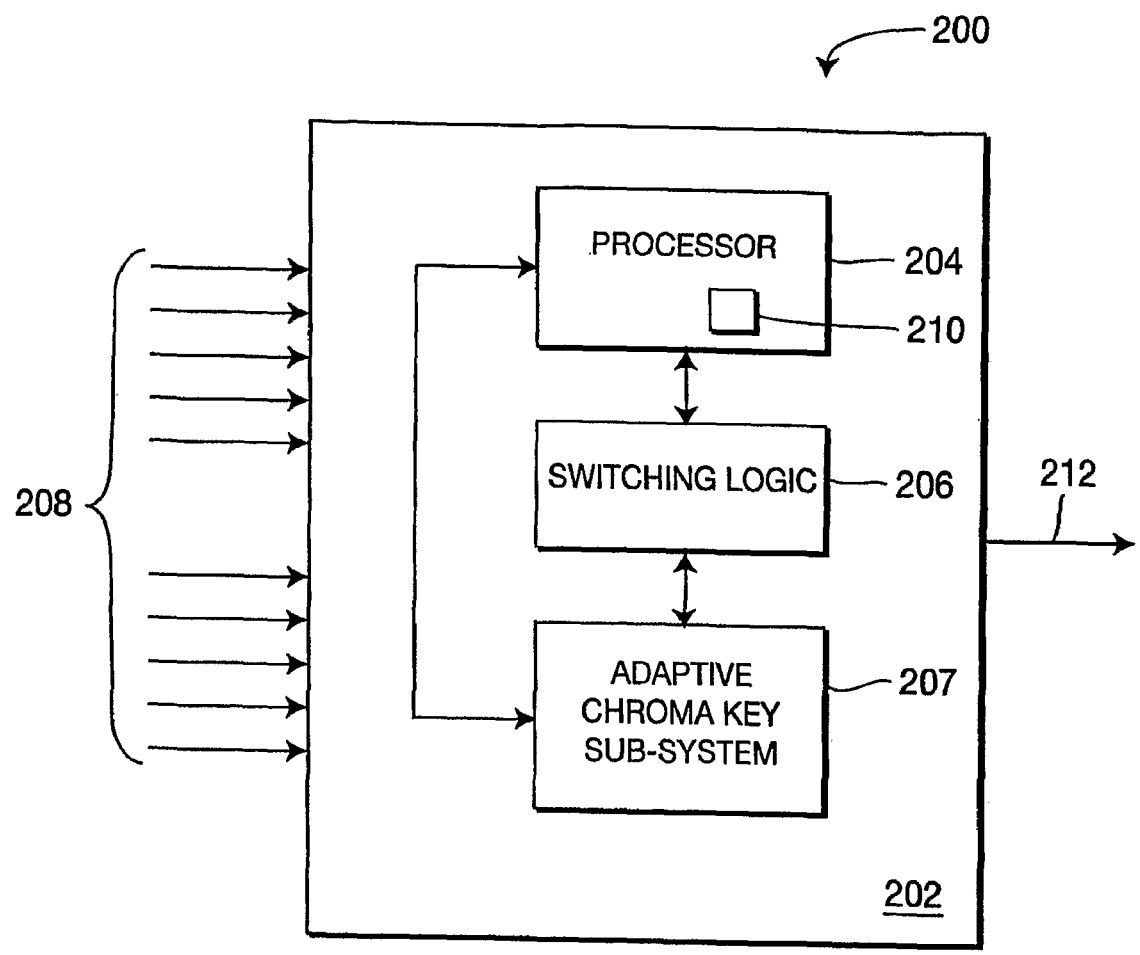
FIG. 12 is a block diagram of a switcher apparatus configured to implement the adaptive chroma keying of the present principles.

FIG. 12 shows a block diagram of a switcher system 200 programmed to operate in accordance with the present principles. The switcher 202 includes a plurality of inputs 208, a processor 204 and switching logic 206 in communication with the processor. The processor 208 can include an onboard memory 210, or may be linked to an external storage medium, such as a hard disk drive, a compact disc drive, a flash memory or other solid state memory device, or any other memory storage means. The adaptive chroma key sub-system 207 is communication with the processor 204 and switching logic 206 and is configured to perform the method of the present principle and take one of said inputs 208 having a background scene and selectively combine it with another input having a foreground scene to provide a desired composite scene at its output 212.

Figure 13:
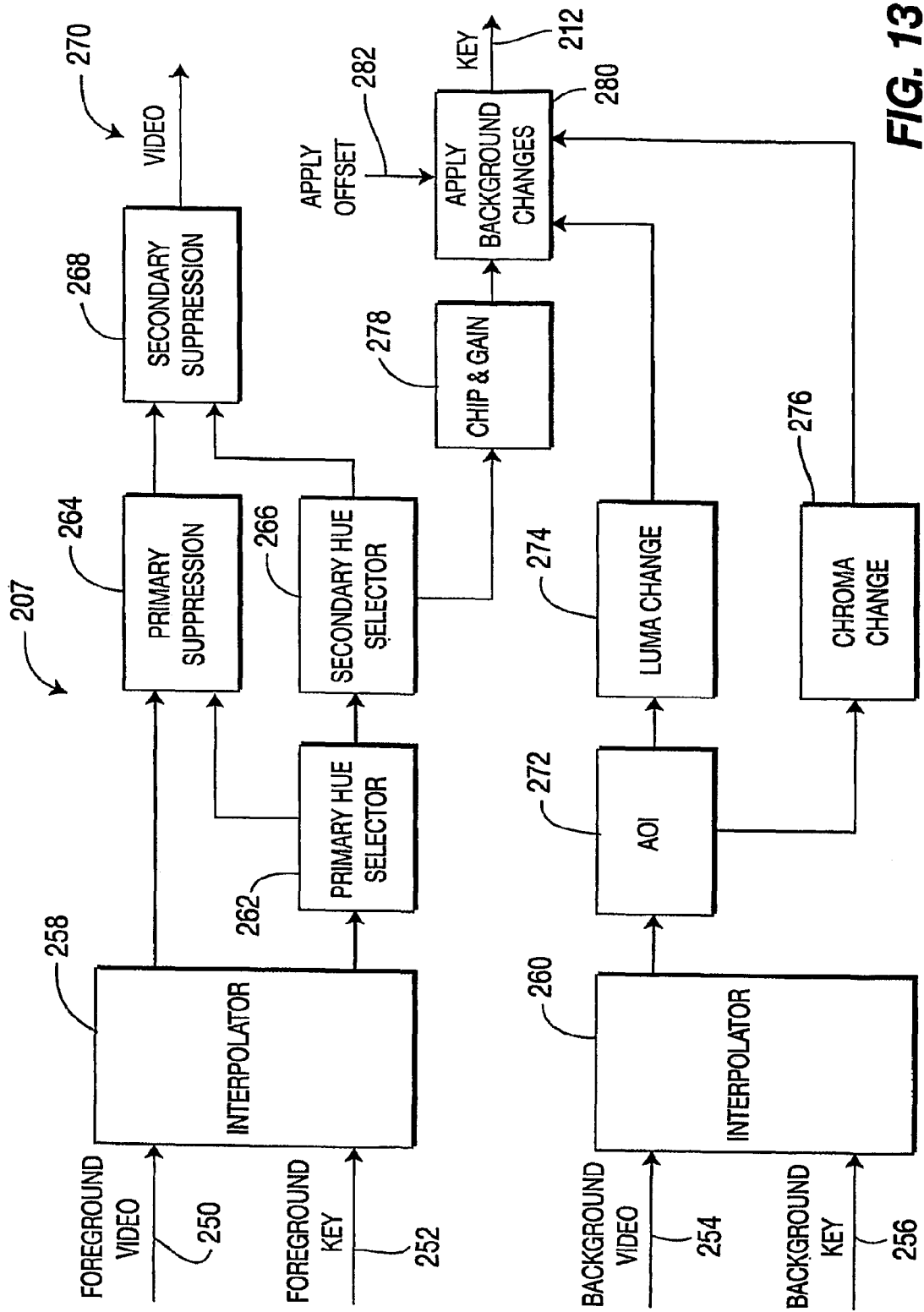
FIG. 13 is a block diagram of an adaptive chroma key subs system according to an implementation of the present principles.

FIG. 13 shows a block diagram of the adaptive chroma key sub-system 207 according to an implementation of the present principles. The foreground video 250 and foreground key 252 are interpolated by interpolator 258. After hue selection (via primary hue selector 262 and secondary hue selector 266) and suppression (via primary suppression 264 and secondary suppression 268, the video 270 is passed to the next logical subsystem in the switcher 202 (e.g., switching logic 206). The secondary hue selector 266 outputs the foreground information which processed (clip & gain 278) before the background changes are applied 280. The background video 254 and background key 256 are interpolated by interpolator 260, and the AOI is then determined 272. As described above, once the AOI has been determined; the Luma change 274 and chroma change 276 of the AOI is determined and are applied 280 to the foreground. At this, stage, the offset 282 is applied to the foreground key signal and the foreground key 212 is output.

The various aspects, implementations, and features may be implemented in one or more of a variety of manners, even if described above without reference to a particular manner or using only one manner. For example, the various aspects, implementations, and features may be implemented using, for example, one or more of a method, an apparatus, an apparatus or processing device for performing a method, a program or other set of instructions, an apparatus that includes a program or a set of instructions, and a computer readable medium.

An apparatus may include, for example, discrete or integrated hardware, firmware, and software. As an example, an apparatus may include, for example, a processor, which refers to processing devices in general, including, for example, a microprocessor, an integrated circuit, or a programmable logic device. As another example, an apparatus may include one or more computer readable media having instructions for carrying out one or more processes.

A computer readable medium may include, for example, a software carrier or other storage device such as, for example, a hard disk, a compact diskette, a random access memory ("RAM"), or a read-only memory ("ROM"). A computer readable medium also may include, for example, formatted electromagnetic waves encoding or transmitting instructions. Instructions may be, for example, in hardware, firmware, software, or in an electromagnetic wave. Instructions may be found in, for example, an operating system, a separate application, or a combination of the two. A processor may be characterized, therefore, as, for example, both a device configured to carry out a process and a device that includes a computer readable medium having instructions for carrying out a process.

A number of implementations have been described. Nevertheless, it will be understood that various modifications may be made. For example, elements of different implementations may be combined, supplemented, modified, or removed to produce other implementations. Accordingly, other implementations are within the scope of the following claims:

The invention claimed is:

1. A method for producing a chroma key comprising:
    determining an area of interest for a composite scene by overlaying a foreground key on a background scene and by identifying pixels in the background scene that are within the foreground key;
    generating a chroma key based on at least a luminance of the pixels identified within the area of interest and by adapting luma in the foreground key to luma in the area of interest;
    calculating an average luminance of the pixels within the area of interest; and
    calculating an average luminance of a sampled area in the foreground key, wherein the luma in the foreground key are adapted to luma in the area of interest by applying a difference between the average luminance of the pixels in the area of interest and the average luminance of the foreground key and applying the difference to the foreground scene for every field.

2. The method of claim 1, wherein said generating further comprises generating the aroma key based on a chrominance signal of each pixel within the area of interest, and wherein the physical property of chrominance is based on the chrominance signal.

3. The method of claim 2, wherein said generating further comprises:
   determining whether a constant vector based on the chrominance signal is applied to all pixels in the area of interest; and
   when a constant vector is applied to all pixels, applying a percentage of the same constant vector to a resulting foreground scene.

4. The method of claim 2, wherein said generating further comprises:
   determining whether a constant vector based on the chrominance signal is applied to all pixels in the area of interest; and
   when a constant vector is not applied to all pixels, making no change to a resulting foreground scene.

5. The method of claim 3, wherein said percentage comprises 5-10% of the constant vector.

6. An apparatus for producing a chroma key, the apparatus comprising:
   means for determining an area of interest for a composite scene by overlaying a foreground key on a background scene and by identifying pixels in the background scene that are within the foreground key;
   means for generating a chroma key based on at least luminance of the pixels identified within the area of interest and by adapting luma in the foreground key to luma in the area of interest
   means for calculating an average luminance of the pixels within the area of interest; and
   means for calculating an average luminance of a sampled area in the foreground key, wherein the luma in the foreground key are adapted to luma in the area of interest by applying a difference between the average luminance of the pixels in the area of interest and the average luminance of the foreground key and applying the difference to the foreground scene for every field.

7. The apparatus of 6, wherein said generating means further comprises means for generating the chroma key based on a chrominance signal of each pixel within the area of interest, and wherein the physical property of chrominance is based on the chrominance signal.

8. The apparatus of 7, wherein said generating means comprises:
   means for determining whether a constant vector based on the chrominance signal is applied to all pixels in the area of interest; and
   means for applying a percentage of the same constant vector to a resulting foreground scene when it is determined a constant vector is applied to all pixels.

9. The apparatus of 7, wherein said generating means comprises;
   means for determining whether a constant vector based on the chrominance signal is applied to all pixels in the area of interest; and
   means for making no change to a resulting foreground scene when a constant vector is not applied to all pixels.

10. The apparatus of 7, wherein said percentage comprises 5-10% of the constant vector.

11. An apparatus for producing a chroma key, comprising:
   a source selection device configured to:
      determine an area of interest for a composite scene by overlaying a foreground key on a background scene and by identifying pixels in the background scene that are within the foreground key; and
      generate a chroma key based on at least luminance of the pixels identified within the area of interest and by adapting luma in the foreground key to luma in the area of interest, wherein the luma in the foreground key are adapted to luma in the area of interest by applying a difference between the average luminance of the pixels in the area of interest and the average luminance of the foreground key and applying the difference to the foreground scene for every field.

12. The apparatus of claim 11, wherein said source selection device comprises:
   a plurality of input sources;
   a processor;
   switching logic in communication with the processor; and
   an adaptive chroma key sub-system connected to the processor and switching logic, said adaptive chroma key sub-system operating under the control of the processor to selectively combine two or more of the input sources for the composite scene.

13. The apparatus of claim 11, wherein the physical properties of the pixels comprise luminance and chrominance signals.

14. The apparatus of claim 13, wherein said source selection device is further configured to:
   calculate an average luminance of pixels in the area of interest and a sampled area in the foreground key; and
   generate the chroma key by providing link data for linking the luma in the foreground key to the luma in the area of interest.

15. The apparatus of claim 13, wherein said source selection device is further configured to determine whether a constant vector based on the chrominance signal is applied to all pixels in the area of interest, and when a constant vector is applied to all pixels in the area of interest, to apply a percentage of the same constant vector to a resulting foregoing scene in the composite scene.

16. The method of claim 2, wherein the chroma key adapts objects in the foreground scene within the area of interest to hue changes in the background scene within the area of interest.

17. The apparatus of claim 7, wherein the chroma key adapts objects in the foreground scene within the area of interest to hue changes in the background scene within the area of interest.

18. The apparatus of claim 11, wherein the source selection device is further configured to generate the chroma key based on a chrominance signal of each pixel within the area of interest, and wherein the physical property of chrominance is based on the chrominance signal.

19. The apparatus of claim 11, wherein the chroma key adapts objects in the foreground scene within the area of interest to hue changes in the background scene within the area of interest.

* * * * *